(12) United States Patent
Okamoto et al.

(10) Patent No.: US 10,655,526 B1
(45) Date of Patent: May 19, 2020

(54) SUPPORT FOR ELECTRIC HEATING TYPE CATALYST AND EXHAUST GAS PURIFYING DEVICE

(71) Applicant: NGK INSULATORS, LTD., Nagoya-Shi (JP)

(72) Inventors: Naoki Okamoto, Nagoya (JP); Takayuki Inoue, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 16/668,441

(22) Filed: Oct. 30, 2019

(30) Foreign Application Priority Data

Nov. 16, 2018 (JP) .................................. 2018-215939

(51) Int. Cl.
*F01N 3/20* (2006.01)
*F01N 13/18* (2010.01)
*F01N 3/022* (2006.01)

(52) U.S. Cl.
CPC ....... *F01N 13/1838* (2013.01); *F01N 3/0222* (2013.01); *F01N 3/2013* (2013.01); *F01N 2330/30* (2013.01)

(58) Field of Classification Search
CPC .. F01N 3/2026; F01N 13/1838; F01N 3/0222; F01N 3/2013; F01N 2330/30
USPC ......................................... 422/174, 177, 180
See application file for complete search history.

(56) References Cited

U.S. PATENT DOCUMENTS

| | | | | |
|---|---|---|---|---|
| 2013/0036719 A1* | 2/2013 | Noguchi | ............... | C04B 35/565 55/523 |
| 2013/0224080 A1* | 8/2013 | Ishihara | .................. | H05B 3/06 422/174 |
| 2014/0212339 A1* | 7/2014 | Kaneda | ................. | F01N 3/2828 422/173 |
| 2014/0294688 A1* | 10/2014 | Mase | .................. | C04B 38/0006 422/174 |
| 2014/0294691 A1* | 10/2014 | Kikuchi | ............ | B01D 46/2418 422/180 |
| 2015/0014292 A1* | 1/2015 | Sakuma | .................... | F01N 9/00 219/162 |
| 2015/0030510 A1 | 1/2015 | Mase et al. | | |
| 2016/0281570 A1* | 9/2016 | Mori | ..................... | F01N 3/2013 |
| 2017/0276047 A1* | 9/2017 | Takase | ................. | B01D 53/944 |

FOREIGN PATENT DOCUMENTS

| | | | |
|---|---|---|---|
| JP | 2014-051402 A1 | 3/2014 | |
| WO | 2013/146955 A1 | 10/2013 | |

\* cited by examiner

*Primary Examiner* — Tom P Duong
(74) *Attorney, Agent, or Firm* — Burr & Brown, PLLC

(57) ABSTRACT

A support for an electric heating type catalyst comprises: a honeycomb structure having partition walls that define a plurality of cells, each of cells extending from one end face to other end face to form a fluid path for a fluid; and a pair of electrode layers formed on a side surface of the honeycomb structure, the pair of electrode layers being arranged so as to face each other across a center of the honeycomb structure. The pair of electrode layers is electrically connected to the honeycomb structure. The honeycomb structure side of each of the electrode layers comprises a portion having a thermal expansion coefficient lower than that of the honeycomb structure.

10 Claims, 4 Drawing Sheets

SUPPORT FOR ELECTRIC HEATING TYPE CATALYST AND EXHAUST GAS PURIFYING DEVICE

TECHNICAL FIELD

The present invention relates to a support for an electric heating type catalyst and an exhaust gas purifying device. More particularly, the present invention relates to a support for an electric heating type catalyst including a honeycomb structure and electrode layers, which can effectively suppress cracking in the honeycomb structure, caused by thermal stress due to a difference between a thermal expansion coefficient of the honeycomb structure and a thermal expansion coefficient of the electrode layers; and to an exhaust gas purifying device using the support for the electric heating type catalyst.

Conventionally, a member in which a catalyst is supported on a honeycomb structure made of cordierite or silicon carbide is used for treatment of harmful substances in exhaust gases discharged from motor vehicle engines. Such a honeycomb structure generally has a pillar shaped honeycomb structure that includes partition walls defining a plurality of cells extending from one end face to the other end face to form flow paths for an exhaust gas.

For the treatment of the exhaust gas with the catalyst supported on the honeycomb structure, a temperature of the catalyst is required for being increased to a predetermined temperature. However, as the engine is started, the catalyst temperature is lower, conventionally causing a problem that the exhaust gas is not sufficiently purified. Therefore, a system called an electric heating catalyst (EHC) has been developed. In the system, electrodes are disposed on a honeycomb structure made of conductive ceramics and the honeycomb structure itself generates heat by electrical conduction, whereby the temperature of the catalyst supported on the honeycomb structure is increased to an activation temperature before or during starting of the engine.

Patent Document 1 proposes a honeycomb structure which is a catalyst support and also functions as a heater by applying a voltage, and which can suppress a bias of a temperature distribution when a voltage is applied. More particularly, it proposes that the bias of the temperature distribution generated when the voltage is applied is suppressed by disposing a pair of electrode portions (hereinafter also referred to as "electrode layers") in the form of strip on a side surface of the pillar shaped honeycomb structure in an extending direction of a cell of the honeycomb structure, and disposing one electrode portion of the pair of electrode portions on a side opposed to the other electrode portion of the pair of electrode portions across a center of the honeycomb structure, in a cross section orthogonal to the extending direction of the cell.

The disposing of the electrode layers on the honeycomb structure requires good bonding strength of a connected portion, a decreased change ratio of electrical resistance at the connected portion, and lower contact thermal resistance of the connected portion. As its approach, Patent Document 2 discloses "a honeycomb structure comprising: a honeycomb ceramic body having partition walls and an outer peripheral wall positioned at the outermost periphery, the partition walls defining a plurality of cells extending from one end face to other end face to form flow paths for a fluid, the honeycomb ceramic body containing metallic Si; and a connected portion bonded to an outer peripheral surface of the ceramic body, wherein the connected portion has: a diffusion layer placed at the outer periphery side of the ceramic body, the diffusion layer being mainly based on a metallic silicide; and a metal layer formed on the diffusion layer, and wherein the metal layer contains a metal component as a main component and has a diffused compound having a thermal expansion coefficient of $5.0 \times 10^{-6}/°$ C. or less".

CITATION LIST

Patent Literatures

Patent Document 1: WO 2013/146955
Patent Document 2: Japanese Patent Application Publication No. 2014-51402 A

SUMMARY OF INVENTION

In the invention disclosed in Patent Document 2, the diffusion layer mainly based on a metal silicide and the electrode layer (metal layer) formed on the diffusion layer are disposed on the outer peripheral surface side of the honeycomb structure. However, the electrode layer generally has a higher thermal expansion coefficient than that of the honeycomb structure. Therefore, in the invention disclosed in Patent Document 2, the relationship of the thermal expansion coefficient represents the honeycomb structure<the diffusion layer<the electrode layer, which causes a problem that a thermal stress is generated due to a difference in thermal expansion of each member as the temperature of the support for the electric heating type catalyst increases, and cracks are generated in the honeycomb structure.

In order to suppress the thermal stress due to the difference in the thermal expansion of each member, it is considered that the thermal expansion coefficient of the electrode layers is decreased to reduce the difference in the thermal expansion. However, the materials of the electrode layers are affected on performance, so that it is difficult to adjust the thermal expansion coefficient. Therefore, there is a need for other approaches to alleviate the thermal stress.

The present invention has been made in view of the above problems. An object of the present invention is to provide a support for an electric heating type catalyst having a honeycomb structure and electrode layers, which can effectively suppress cracking in the honeycomb structure caused by thermal stress due to a difference between a thermal expansion coefficient of the honeycomb structure and a thermal expansion coefficient of the electrode layers; and an exhaust gas purifying device using the support for the electric heating type catalyst.

As a result of intensive studies, the present inventors have found that the above problems can be solved by the presence of a portion having a certain thermal expansion coefficient on the honeycomb structure side of each electrode layer. Thus, the present invention is specified as follows:

(1)

A support for an electric heating type catalyst, comprising:

a honeycomb structure having partition walls that define a plurality of cells, each of cells extending from one end face to other end face to form a fluid path for a fluid; and a pair of electrode layers formed on a side surface of the honeycomb structure, the pair of electrode layers being arranged so as to face each other across a center of the honeycomb structure;

wherein the pair of electrode layers is electrically connected to the honeycomb structure, and wherein the honeycomb structure side of each of the electrode layers comprises a portion having a thermal expansion coefficient lower than that of the honeycomb structure.

(2)

The support for the electric heating type catalyst according to (1), wherein a difference between a thermal expansion coefficient of the portion having the thermal expansion coefficient lower than that of the honeycomb structure and the thermal expansion coefficient of the honeycomb structure is 1.0 [ppm]/K or more.

(3)

The support for the electric heating type catalyst according to (1) or (2), wherein the thermal expansion coefficient of the portion having the thermal expansion coefficient lower than that of the honeycomb structure is lower than the thermal expansion coefficient of each of the electrode layers.

(4)

The support for the electric heating type catalyst according to any one of (1) to (3), wherein the portion having the thermal expansion coefficient lower than that of the honeycomb structure is an intermediate layer having a thermal expansion coefficient lower than that of the honeycomb structure.

(5)

The support for the electric heating type catalyst according to (4), wherein the intermediate layer has a thickness of 3 to 400 μm.

(6)

The support for the electric heating type catalyst according to (4) or (5), wherein the intermediate layer has an area larger than that of each of the electrode layers, and wherein, in a projection plane on the side surface of the honeycomb structure, a projection plane of each of the electrode layers is completely included in a projection plane of the intermediate layer.

(7)

The support for the electric heating type catalyst according to any one of (1) to (6), wherein the honeycomb structure comprises a silicon-silicon carbide composite material or silicon carbide as a main component.

(8)

The support for the electric heating type catalyst according to any one of (1) to (7), wherein the portion having the thermal expansion coefficient lower than that of the honeycomb structure comprises an oxide ceramic, or a mixture of a metal or a metal compound and an oxide ceramic.

(9)

The support for the electric heating type catalyst according to any one of (1) to (8), wherein each of the electrode layers comprises a mixture of a metal or a metal compound and an oxide ceramic.

(10)

An exhaust gas purifying device, comprising:

the support for the electric heating type catalyst according to any one of (1) to (9), the support being disposed in an exhaust gas flow path through which an exhaust gas from an engine is allowed to flow; and a cylindrical metal member for housing the support for the electric heating type catalyst.

According to the present invention, it is possible to provide a support for an electric heating type catalyst having a honeycomb structure and electrode layers, which can effectively suppress cracking in the honeycomb structure caused by thermal stress due to a difference between a thermal expansion coefficient of the honeycomb structure and a thermal expansion coefficient of the electrode layers; and an exhaust gas purifying device using the support for the electric heating type catalyst.

DESCRIPTION OF THE PREFERRED EMBODIMENTS

Hereinafter, embodiments of a support for an electrically heating type catalyst according to the present invention will be described with reference to the drawings. However, the present invention is not limited to the embodiments, and various changes, modifications, and improvements may be added without departing from the scope of the present invention, based on knowledge of those skilled in the art.

(1. Honeycomb Structure)

Figure 1:
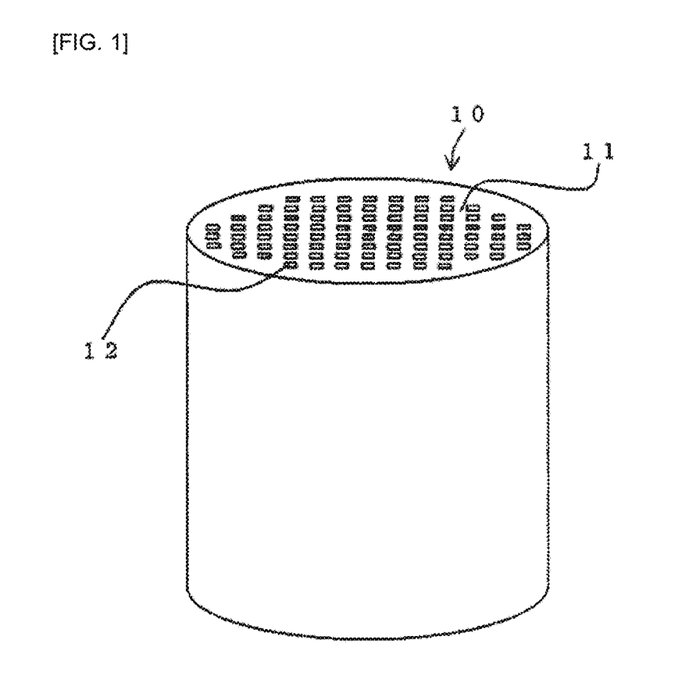
FIG. 1 is a view showing an example of a honeycomb structure according to the present invention.

FIG. 1 is a view showing an example of a honeycomb structure in the present invention. For example, the honeycomb structure 10 includes: porous partition walls 11 that defines a plurality of cells 12, the cells 12 forming flow paths for a fluid, the cells extending from an inflow bottom face that is an end face on an inflow side of the fluid to an outflow bottom face that is an end face on an outflow side of the fluid; and an outer peripheral wall located at the outermost periphery. The number, arrangement, shape and the like of the cells 12, as well as the thickness of each partition wall 11, and the like, are not limited and may be optionally designed as required.

A material of the honeycomb structure 10 is not particularly limited as long as it has conductivity, and metals, ceramics and the like may be used. In particular, from the viewpoint of compatibility of heat resistance and conductivity, preferably, the material of the honeycomb structure 10 is mainly based on a silicon-silicon carbide composite material or silicon carbide, and more preferably, it is a silicon-silicon carbide composite material or silicon carbide. Tantalum silicide ($TaSi_2$) and chromium silicide ($CrSi_2$) may also be added to lower the electric resistivity of the honeycomb structure. The phrase "the honeycomb structure 10 is mainly based on a silicon-silicon carbide composite" means that the honeycomb structure 10 contains 90% by mass or more of the silicon-silicon carbide composite material (total mass) based on the entire honeycomb structure. Here, for the silicon-silicon carbide composite material, it contains silicon carbide particles as an aggregate and silicon as a bonding material for bonding the silicon carbide particles, and a plurality of silicon carbide particles are bonded by silicon so as to form pores between the silicon carbide particles. The phrase "the honeycomb structure 10 is mainly based on silicon carbide" means that the honeycomb structure 10 contains 90% by mass or more of silicon carbide (total mass) based on the entire honeycomb structure.

The electric resistivity of the honeycomb structure 10 may be set as needed depending on voltage to be applied, including, but not particularly limited to, for example 0.001 to 200 Ω·cm, for example. For a higher voltage of 64 V or more, it may be 2 to 200 Ω·cm, and typically 5 to 100 Ω·cm. Further, for a lower voltage of less than 64 V, it may be 0.001 to 2 Ω·cm, and typically 0.001 to 1 Ω·cm, and more typically 0.01 to 1 Ω·Cm.

Each partition wall 11 of the honeycomb structure 10 preferably has a porosity of 35 to 60%, and more preferably 35 to 45%. The porosity of 35% or more can further suppress deformation during firing, which is preferable. The porosity of 60% or less maintains sufficient strength of the honeycomb structure. The porosity is a value measured by a mercury porosimeter.

Each partition wall 11 of the honeycomb structure 10 preferably has an average pore diameter of 2 to 15 μm, and more preferably 4 to 8 μm. The average pore diameter of 2 μm or more can prevent excessively high electric resistivity. The average pore diameter of 15 μm or less can prevent excessively low electric resistivity. The average pore diameter is a value measured by a mercury porosimeter.

The shape of each cell 12 in a cross section of each cell orthogonal to a flow path direction is not limited, but it may preferably be a square, a hexagon, an octagon, or a combination thereof. Among these, the square and hexagonal shapes are preferable. Such a cell shape leads to a decreased pressure loss when an exhaust gas flows through the honeycomb structure 10, and improved purification performance of the catalyst.

The outer shape of the honeycomb structure 10 is not particularly limited as long as it presents a pillar shape, and it may be, for example, a shape such as a pillar shape with circular bottoms (cylindrical shape), a pillar shape with oval shaped bottoms, and a pillar shape with polygonal (square, pentagonal, hexagonal, heptagonal, octagonal, and the like) bottoms, and the like. Further, for the size of the honeycomb structure 10, the honeycomb structure preferably has an area of bottom surfaces of 2000 to 20000 mm$^2$, and more preferably 4000 to 10000 mm$^2$, in terms of increasing heat resistance (preventing cracks generated in a circumferential direction of the outer peripheral side wall). Further, an axial length of the honeycomb structure 10 is preferably 50 to 200 mm, and more preferably 75 to 150 mm, in terms of increasing the heat resistance (preventing cracks generated in a direction parallel to a central axis direction on the outer peripheral side wall).

Further, the honeycomb structure 10 can be used as a catalyst support by supporting a catalyst on the honeycomb structure 10.

Production of the honeycomb structure can be carried out in accordance with a method for making a honeycomb structure in a known method for producing a honeycomb structure. For example, first, a forming material is prepared by adding metallic silicon powder (metallic silicon), a binder, a surfactant(s), a pore former, water, and the like to silicon carbide powder (silicon carbide). It is preferable that a mass of metallic silicon powder is 10 to 40% by mass relative to the total of mass of silicon carbide powder and mass of metallic silicon powder. The average particle diameter of the silicon carbide particles in the silicon carbide powder is preferably 3 to 50 μm, and more preferably 3 to 40 μm. The average particle diameter of the metallic silicon particles in the metallic silicon powder is preferably 2 to 35 μm. The average particle diameter of each of the silicon carbide particles and the metallic silicon particles refers to an arithmetic average diameter on volume basis when frequency distribution of the particle size is measured by the laser diffraction method. The silicon carbide particles are fine particles of silicon carbide forming the silicon carbide powder, and the metallic silicon particles are fine particles of metallic silicon forming the metallic silicon powder. It should be noted that this is formulation for forming raw materials in the case where the material of the honeycomb structure is the silicon-silicon carbide composite material. In the case where the material of the honeycomb structure is silicon carbide, no metallic silicon is added.

Examples of the binder include methyl cellulose, hydroxypropyl methyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably 2.0 to 10.0 parts by mass when the total mass of the silicon carbide powder and the metallic silicon powder is 100 parts by mass.

The content of water is preferably 20 to 60 parts by mass when the total mass of the silicon carbide powder and the metallic silicon powder is 100 parts by mass.

The surfactant that can be used includes ethylene glycol, dextrin, fatty acid soaps, polyalcohol and the like. These may be used alone or in combination of two or more. The content of the surfactant is preferably 0.1 to 2.0 parts by mass when the total mass of the silicon carbide powder and the metallic silicon powder is 100 parts by mass.

The pore former is not particularly limited as long as the pore former itself forms pores after firing, including, for example, graphite, starch, foamed resins, water absorbing resins, silica gel and the like. The content of the pore former is preferably 0.5 to 10.0 parts by mass when the total mass of the silicon carbide powder and the metallic silicon powder is 100 parts by mass. An average particle diameter of the pore former is preferably 10 to 30 μm. The average particle diameter of 10 μm or more can allow sufficient formation of pores. The average particle diameter of 30 μm or less can allow prevention of a die from being clogged with the pore former during forming. The average particle diameter of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb structure. In extrusion molding, a die having a desired overall shape, cell shape, partition wall thickness, cell density and the like can be used. Preferably, the resulting honeycomb structure is then dried. When the length in the central axis direction of the honeycomb structure is not the desired length, both the bottom faces of the honeycomb structure can be cut to the desired length.

(2. Electrode Layer)

Figure 2:
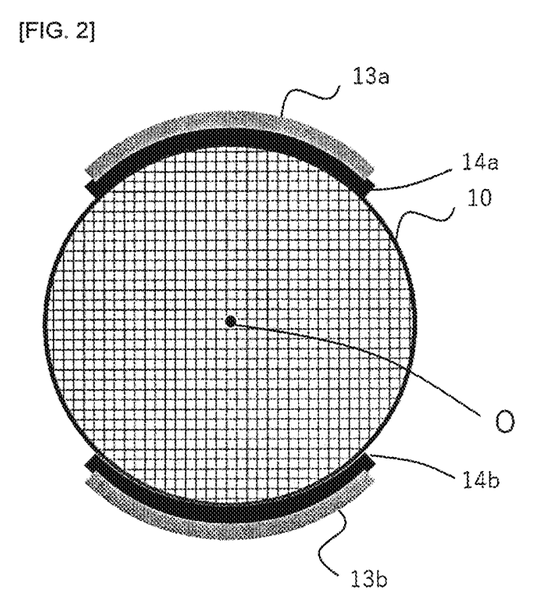
FIG. 2 is a view showing a structure of a support for an electric heating type catalyst according to an embodiment of the present invention.

As shown in FIG. 2, the support for the electric heating type catalyst includes a pair of electrode layers 13a, 13b on the outer peripheral wall of the honeycomb structure 10. Each of the electrode layers 13a, 13b is formed into a strip shape extending in the extending direction of the cell 12 of the honeycomb structure 10. Each of the electrode layers 13a, 13b is electrically connected to the honeycomb structure 10. In a cross section of the honeycomb structure 10 orthogonal to the extending direction of the cell 12, the pair of electrode layers 13a, 13b are arranged so as to face each other across a center O of the honeycomb structure 10. Such a configuration allows suppression of any bias of a current flowing in the honeycomb structure 10 and suppression of any bias of a temperature distribution in the honeycomb structure 10 when a voltage is applied.

The electrode layers 13a, 13b are formed of a material having conductivity. The electrode layers 13a, 13b are preferably made of an oxide ceramic or a mixture of a metal or a metal compound and an oxide ceramic. The metal may be either a single metal or an alloy, including, for example, silicon, aluminum, iron, stainless steel, titanium, tungsten, Ni—Cr alloys and the like. Examples of the metal compound other than the oxide ceramic include metal oxides, metal nitrides, metal carbides, metal silicides, metal borides, composite oxides, and the like, and for example, $FeSi_2$, $CrSi_2$, alumina, silica, titanium oxide and the like can be preferably used. Each of the metal and the metal compound may be used alone or in combination of two or more types.

Specific examples of the oxide ceramic include glass, cordierite, and mullite.

The glass may further contain an oxide consisting of at least one component selected from the group consisting of B, Mg, Al, Si, P, Ti and Zr. The further containing of at least one selected from the above group is preferable in order to allow further improvement of the strength of each electrode layer.

Further, although not shown, the support for the electric heating type catalyst further includes a pair of electrode portions which are electrically connected to the electrode layers 13a, 13b, respectively. According to the arrangement, when a voltage is applied through the electrode layers 13a, 13b, the metal electrode portions can be energized to cause the honeycomb structure 10 to generate heat by Joule heat. Therefore, the honeycomb structure 10 can be suitably used as a heater. The applied voltage is preferably 12 to 900 V, and more preferably 64 to 600 V. However, the applied voltage may be changed as needed.

For the electrode portions, a metal, a ceramic or the like may be used. Examples of a metal include, but not limited to, representatively, silver, copper, nickel, gold, palladium, silicon, and the like, in terms of ease of availability. It is also possible to use carbon. Non-limiting examples of ceramics include ceramics containing at least one of Si, Cr, B, Fe, Co, Ni, Ti and Ta, and illustratively, silicon carbide, chromium silicide, boron carbide, chromium boride, and tantalum silicide. Composite materials may be formed by combining the metals with the ceramics.

(3. Portion Having Thermal Expansion Coefficient Lower than that of Honeycomb Structure)

As shown in FIG. 2, the support for the electric heating type catalyst according to the present embodiment includes portions 14a, 14b each having a thermal expansion coefficient lower than that of the honeycomb structure 10 on the honeycomb structure side of each of the electrode layers 13a, 13b (hereinafter abbreviated as "portions 14a, 14b"). Here, it is important that the portions 14a, 14b have a lower thermal expansion coefficient than that of the honeycomb structure 10.

As described above, the electrode layers generally have a higher thermal expansion coefficient than that of the honeycomb structure. Therefore, there has been a problem that a thermal stress is generated due to a difference in thermal expansion of each member as the temperature of the support for the electric heating type catalyst increases, thereby generating cracks in the honeycomb structure. So, the portions 14a, 14b having the thermal expansion coefficient lower than that of the honeycomb structure 10 are provided on the honeycomb structure sides of the electrode layers 13a, 13b. Since the thermal expansion coefficient of the portions 14a, 14b is lower than that of the honeycomb structure 10, the thermal expansion of the portions 14a, 14b is less than that of the honeycomb structure 10 even if the temperature of the support for the electric heating type catalyst is increased, whereby the thermal expansion of parts near the electrode layers 13a, 13b in the honeycomb structure 10 is suppressed, and cracks can be prevented.

The above effects can be obtained if the thermal expansion coefficient of the portions 14a, 14b is lower than that of the honeycomb structure 10. However, in order to obtain more remarkable effects, a difference between the thermal expansion coefficient of each of the portions 14a, 14b and the honeycomb structure 10 is preferably 1.0 [ppm]/K or more. The difference of 1.0 [ppm]/K or more can more strongly suppress the thermal expansion of the honeycomb structure 10, so that the cracks are further prevented. From this viewpoint, the difference between the thermal expansion coefficient of each of the portions 14a, 14b and the thermal expansion coefficient of the honeycomb structure 10 is more preferably 1.3 [ppm]/K or more, and more preferably 1.5 [ppm]/K or more.

It is preferable that the thermal expansion coefficient of each of the portions 14a, 14b is lower than the thermal expansion coefficient of each of the electrode layers 13a, 13b. This can provide advantages that the portions 14a, 14b more reliably ensure the above role, as well as the thermal expansion coefficient of each of the electrode layers 13a, 13b can be more freely set, and a range for selecting the materials is expanded.

Figure 3:
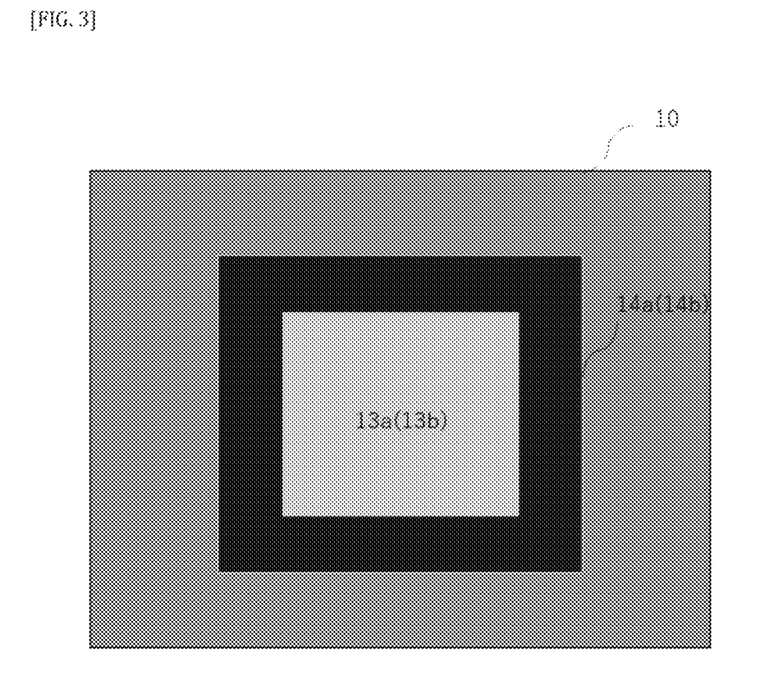
FIG. 3 is a projection plane on a side surface of a honeycomb structure according to an embodiment of the present invention.

In the drawing, each of the portions 14a, 14b forms a continuous layer (see FIGS. 2 and 3). However, each of the portions 14a, 14b does not necessarily have to form a layer alone, and can be arranged in any form as long as the portions 14a, 14b can achieve their functions. That is, the portions each having the thermal expansion coefficient lower than that of the honeycomb structure only need to be present on the honeycomb structure side of the electrode layers, and each portion may form a part of the electrode layer, or may be included in a separate layer, or may form a layer itself that is different from the electrode layer. For example, each of the portions 14a, 14b may be included in one layer (which may be each of the electrode layers 13a, 13b or may be a layer provided separately from each of the electrode layers 13a, 13b) in a state where each of the portions 14a, 14b is continuous to a certain extent. It should be noted that each of the portions 14a, 14b necessarily does not have a constant thermal expansion coefficient, and may vary continuously or discontinuously as long as it has the thermal expansion coefficient lower than that of the honeycomb structure 10. In the embodiment where each of the portions 14a, 4b is included in a part of each of the electrode layers 13a, 13b, it is assumed that there is a portion having a thermal expansion coefficient higher than that of the honeycomb structure 10 on the radially outer side of each of the portions 14, 14b in each of the electrode layers 13a, 13b.

It is, of course, preferable that each of the portions 14a, 14b forms a layer in view of more reliably obtaining the effect of the present invention, industrial convenience and the like (see FIG. 3). In this case, since each of the portions 14a, 14b is located between the honeycomb structure 10 and each of the electrode layers 13a and 13b, these portions are called intermediate layers. FIG. 3 is a view of a projection plane of the side surface of the honeycomb structure 10. In the drawing, the portions 14a, 14b and the electrode layers 13a, 13b are all rectangular, and the electrode layers 13a, 13b are arranged at the center positions of the portions 14a, 14b, respectively. However, their shapes and positions are not limited thereto. As with the above description, each intermediate layer only needs to have a thermal expansion coefficient lower than that of the honeycomb structure 10. That is, the thermal expansion coefficient of each intermediate layer does not need to be constant. For example, a case where the thermal expansion coefficient continuously or discontinuously increases (or decreases) from the honeycomb structure 10 side toward each of the electrode layers 13a, 13b is also included in the scope of the present invention.

Further, when the portions 14a, 14b form the intermediate layers, each of them preferably has a thickness in a range of 3 to 400 μm. The thickness of each intermediate layer of 3 μm or more can provide a more remarkable effect. On the other hand, the thickness of each intermediate layer of 400 μm or less can suppress the influence on a current flowing through the honeycomb structure 10, so that the influence on the original function of the support for the electric heating type catalyst can be minimized. From the above viewpoint, the thickness of each intermediate layer is more preferably 5 to 100 μm.

Further, when the portions 14a, 14b form the intermediate layers, an area of each intermediate layer is larger than that of each of the electrode layers 13a, 13b in terms of more reliably suppressing thermal stress due to the difference in thermal expansion between the honeycomb structure 10 and each of the electrode layers 13a, 3b, so that a projection plane of each of the electrode layers 13a, 13b is completely included in a projection plane of each intermediate layer in a projection plane on the side surface of the honeycomb structure 10 (see FIG. 3). That is, since each of the portions 14a, 14b always lies between the honeycomb structure 10 and each of the electrode layers 13a, 13b, any generation of thermal stress in the local portion can be suppressed. It should be noted that pinholes may be generated in each intermediate layer, through which the components of the electrode layers 13a, 13b may penetrate, due to the setting of the thickness of each intermediate layer and production restrictions, but the above effect is not inhibited because their influences are smaller.

The problem of the present invention can be solved as long as the thermal expansion coefficient of each of the portions 14a, 14b is lower than the thermal expansion coefficient of the honeycomb structure 10. However, in terms of maintaining the thermal resistance at a lower level and maintaining the change rate of electrical resistance of the connected portion and contact thermal resistance of the connected portion at lower levels, each of the portions 14a, 14b is preferably made of an oxide ceramic or a mixture of a metal or a metal compound and an oxide ceramic, as with the electrode layers 13a, 13b as described above.

The metal may be either a single metal or an alloy, including, for example, silicon, aluminum, iron, stainless steel, titanium, tungsten, Ni—Cr alloy and the like. Examples of the metal compound other than the oxide ceramic include oxides, metal nitrides, metal carbides, metal silicides, metal borides, and complex oxides. For example, $FeSi_2$ and $CrSi_2$ can be preferably used. Each of the metal and the metal compound may be used alone or in combination of two or more types. Specific examples of the oxide ceramic include glass, cordierite, and mullite.

The glass may further, contain an oxide consisting of at least one component selected from the group consisting of B, Mg, Al, Si, P, Ti and Zr. The further containing of at least one selected from the above group is preferable in order to allow further improvement of the strength of each electrode layer.

Each intermediate layer and each electrode layer can be produced by the following method, for example. For a method for forming each intermediate layer, metal powder (metal powder such as metal silicide, stainless steel) and glass powder are mixed together to prepare a ceramic raw material. To the ceramic raw material are added a binder and a surfactant, and further added water to prepare an intermediate layer paste. The intermediate layer paste is applied onto the honeycomb structure using screen printing or the like to form a coated film. The coated film is dried and then fired together with the honeycomb structure under vacuum conditions to form each intermediate layer. As a material for each electrode layer, metal powder (metal powder such as metal silicide and stainless steel) and glass powder are then mixed to form a ceramic raw material. To the ceramic raw material are added a binder and a surfactant, and further added water to prepare an electrode layer paste. The electrode layer paste is applied onto the honeycomb structure on which each intermediate layer has been formed, by screen printing or the like to form a coated film. The coated film is dried, and the honeycomb structure on which the coated film has been formed is then fired under vacuum conditions to form each electrode layer.

In the above description, each intermediate layer and each electrode layer are formed by carrying out the firing every time the respective layers are formed, in such a manner that the coated film for the intermediate layer is fired to form each intermediate layer, and the coated film for the electrode layer is fired to form each electrode layer. However, the firing for forming each intermediate layer may not be performed. That is, each intermediate layer and each electrode layer can be formed at the same time by forming the coated film for the electrode layer on the coated film for the intermediate layer and firing this. In this case, when the same material is used for the intermediate layer and the electrode layer, the materials of the intermediate layer and the electrode layer are intermingled during firing, so that there is no interface between the intermediate layer and the electrode layer and the electrode layer and the intermediate layer are integrated. In this case, there is a portion having a thermal expansion coefficient lower than that of the honeycomb structure on the honeycomb structure side of each electrode layer.

The support for the electric heating type catalyst according to the present invention can be used in an exhaust gas purifying device, That is, another aspect of the present invention is an exhaust gas purifying device, comprising: the support for the electric heating type catalyst according to the present invention, the support being disposed in an exhaust gas flow path through which an exhaust gas from an engine is allowed to flow; and a cylindrical metal member for housing the support for the electric heating type catalyst. As will be understood from the above descriptions, in such an exhaust gas purifying device, any cracking in the honeycomb structure is suppressed, so that higher thermal shock resistance can be expected.

EXAMPLES

Hereinafter, Examples is illustrated for better understanding of the present invention and its advantages, but the present invention is not limited to these Examples.

(1. Production of Honeycomb Dried Body)

Silicon carbide (SiC) powder and metallic silicon (Si) powder were mixed in a mass ratio of 60:40 to prepare a ceramic raw material. To the ceramic raw material were added hydroxypropyl methyl cellulose as a binder, a water absorbing resin as a pore former, and water to form a forming raw material. The forming raw material was then kneaded by means of a vacuum green body kneader to prepare a circular pillar shaped green body. The content of the binder was 7 parts by mass when the total of the silicon carbide powder (SiC) and the metallic silicon (Si) powder was 100 parts by mass. The content of the pore former was 3 parts by mass when the total of the silicon carbide powder (SiC) and the metallic silicon (Si) powder was 100 parts by mass. The content of water was 42 parts by mass when the total of the silicon carbide powder (SiC) and the metallic silicon (Si) powder was 100 parts by mass. The average particle diameter of the silicon carbide particles in the silicon carbide powder was 20 µm, and the average particle diameter of the metallic silicon particles in the metallic silicon powder was 6 µm. The average particle diameter of the pore former was 20 µm. The average particle diameter of each of the silicon carbide particles, the metallic silicon particles and the pore former refers to an arithmetic mean diameter on volume basis, when measuring frequency distribution of a particle size by the laser diffraction method. In addition, a Young's modulus and a porosity of each honeycomb structure to be finally obtained are shown in Table 1.

The resulting pillar shaped green body was formed using an extruder to obtain a pillar shaped honeycomb formed body in which each cell had a square cross-sectional shape. The resulting honeycomb formed body was subjected to high-frequency dielectric heating and drying and then dried at 120° C. for 2 hours using a hot air drier, and a predetermined amount of both end faces were cut to prepare a honeycomb dried body.

(2. Formation of Intermediate Layer)

Each intermediate layer was provided as a portion having a thermal expansion coefficient lower than that of the honeycomb structure. The conditions are as follows:

(1) Metal powder (powder of a metal such as metal silicide and stainless steel) and glass powder were mixed at each volume ratio as shown in Table 1 to prepare a ceramic raw material. The average particle diameter was 10 µm for the metal powder and 2 µm for the glass powder. The average particle diameter refers to an arithmetic average diameter on volume basis when frequency distribution of the particle size is measured by a laser diffraction method.

(2) To the above ceramic raw material were added 1% by mass of a binder, 1% by mass of a surfactant, and 30% by mass of water to form a paste.

Figure 4:
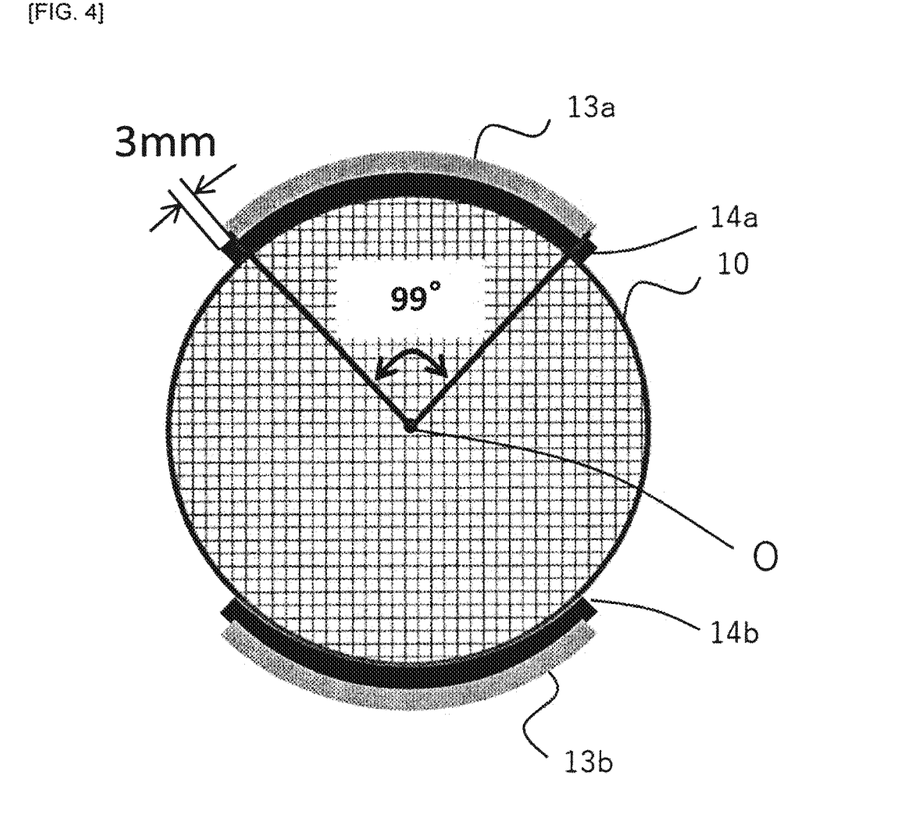
FIG. 4 is a view showing a structure of a support for an electric heating type catalyst produced according to an embodiment of the present invention.

(3) The paste was applied on the above honeycomb dried body (a substrate) using screen printing, such that the paste was applied to a region where both sides of each electrode layer to be provided is extended by +3 mm in the circumferential direction, and both end faces of the paste in the axial direction were matched to both end faces of the substrate in the substrate of length direction (a cell extending direction) (see FIG. 4).

(4) After applying the paste, the paste was dried at 120° C. for 30 minutes by a hot air dryer, and then fired together with the substrate under vacuum conditions at 1100° C. for 30 minutes.

The compositions and characteristics of the intermediate layer in each Example and Comparative Example are shown in Table 1.

(3. Formation of Electrode Layer)

Each electrode layer was provided on each intermediate layer. The conditions for forming each electrode layer are as follows:

(1) Stainless steel powder (SUS430) and glass powder were mixed at a volume ratio of stainless powder ratio of 40% and glass powder ratio of 60% to prepare a ceramic raw material. The average particle diameter was 10 µm for the stainless powder and 2 µm for the glass powder. The average particle diameter refers to an arithmetic average diameter based on volume basis when frequency distribution of the particle size is measured by a laser diffraction method.

(2) To the above ceramic raw material were added 1% by mass of a binder, 1% by mass of a surfactant, and 30% by mass of water to form a paste.

(3) The paste was applied on the substrate provided with each intermediate layer using screen printing, such that the paste was applied over a width provided by an area of 99° in the circumferential direction, and both end faces of the paste in the axial direction were matched to both end faces of the substrate in the substrate L dimension direction (a cell extending direction) (see FIG. 4).

(4) After applying the paste, the paste was dried at 120° C. for 30 minutes by a hot air dryer, and then fired together with the substrate under vacuum conditions at 1100° C. for 30 minutes to form each electrode layer on each intermediate layer.

In each support for the electric heating type catalyst obtained by the above procedure, a pair of electrode layers is formed on the side surface of the honeycomb structure. In each of Examples and Comparative Examples, the thermal expansion coefficient of each electrode layer was 6.3 [ppm]/K.

Further, in each of Examples and Comparative Examples, the thermal expansion coefficient of each honeycomb structure was 4.3 [ppm]/K.

Each support for the electric heating type catalyst obtained by the above procedure was subjected to a heating/cooling cycle test. The heating/cooling cycle test was carried out by placing each support for electric heating type catalyst in a rapid heating/cooling furnace, and increasing and decreasing the temperature in one minute for heating and in one minute for cooling over 50 cycles such that the increasing and decreasing of the temperature of each honeycomb structure was repeated in the range of 50° C. to 950° C. For each of Examples and Comparative Example, 20 samples for the same support for the electric heating type catalyst were prepared according to the above procedure, and the number of samples where cracks were generated per the 20 samples, was counted. The results are shown in Table 1.

TABLE 1

| | Composition of Intermediate Layer (vol %) | Thermal Expansion Coefficient of Intermediate Layer ([ppm/K]) | Honeycomb Structure Thermal Expansion Coefficient - Intermediate Layer Thermal Expansion Coefficient (GPa) ([ppm/K]) | Young's Modulus | Porosity (%) | Compressive Stress of Honeycomb Structure (MPa) | Number of Cracks |
|---|---|---|---|---|---|---|---|
| Comparative Example 1 | Non | — | — | — | — | 19.1 | 20/20 |
| Comparative Example 2 | SUS304 20 Glass 80 | 5.2 | −0.9 | 170 | 0 | 232 | 20/20 |

TABLE 1-continued

|  | Composition of Intermediate Layer (vol %) | Thermal Expansion Coefficient of Intermediate Layer ([ppm/K]) | Honeycomb Structure Thermal Expansion Coefficient - Intermediate Layer Thermal Expansion Coefficient (GPa) ([ppm/K] | Young's Modulus | Porosity (%) | Compressive Stress of Honeycomb Structure (MPa) | Number of Cracks |
|---|---|---|---|---|---|---|---|
| Example 1 | SUS430 20 Glass 80 | 4.0 | 0.3 | 170 | 0 | 14.5 | 14/20 |
| Example 2 | FeSi$_2$ 10 Glass 90 | 3.1 | 1.2 | 170 | 0 | 8.9 | 5/20 |
| Example 3 | SUS430 10 Glass 90 | 3.0 | 1.3 | 170 | 0 | 8.2 | 3/20 |
| Example 4 | SUS304 6 Glass 94 | 3.0 | 1.3 | 170 | 0 | 8.2 | 4/20 |
| Example 5 | CrSi$_2$ 10 Glass 80 | 2.9 | 1.4 | 170 | 0 | 7.5 | 4/20 |
| Example 6 | Glass 100 | 2.0 | 2.3 | 170 | 0 | 2.7 | 0/20 |
| Example 7 | SUS430 10 Glass 90 | 3.0 | 1.3 | 153 | 10 | 9.2 | 5/20 |
| Example 8 | SUS430 10 Glass 90 | 3.0 | 1.3 | 136 | 20 | 10.2 | 8/20 |

As shown in Table 1, it is understood that Examples of the present invention effectively suppress cracks as compared with Comparative Example. In particular, it can be seen that when the difference between the thermal expansion coefficient of the intermediate layer and the thermal expansion coefficient of the honeycomb structure is 1.0 [ppm]/K or more, the generation of cracks is further significantly reduced.

On the other hand, in Comparative Examples 1 and 2 that did not include the portion having the thermal expansion coefficient lower than that of the honeycomb structure, cracks were generated for all the samples. Particularly, in Comparative Example 2, the intermediate layers were formed, but the coefficient of thermal expansion was beyond the range defined by the present invention, so that any desired function could not be achieved.

DESCRIPTION OF REFERENCE NUMERALS

10 . . . honeycomb structure
11 . . . partition wall
12 . . . cell
13a, 13b . . . electrode layer
14a, 14b . . . portion having thermal expansion coefficient lower than that of honeycomb structure

What is claimed is:

1. A support for an electric heating type catalyst, comprising:
   a honeycomb structure having partition walls that define a plurality of cells, each of cells extending from one end face to other end face to form a fluid path for a fluid; and
   a pair of electrode layers formed on a side surface of the honeycomb structure, the pair of electrode layers being arranged so as to face each other across a center of the honeycomb structure;
   wherein the pair of electrode layers is electrically connected to the honeycomb structure, and
   wherein the honeycomb structure side of each of the electrode layers comprises a portion having a thermal expansion coefficient lower than that of the honeycomb structure.

2. The support for the electric heating type catalyst according to claim 1, wherein a difference between a thermal expansion coefficient of the portion having the thermal expansion coefficient lower than that of the honeycomb structure and the thermal expansion coefficient of the honeycomb structure is 1.0 [ppm]/K or more.

3. The support for the electric heating type catalyst according to claim 1, wherein the thermal expansion coefficient of the portion having the thermal expansion coefficient lower than that of the honeycomb structure is lower than the thermal expansion coefficient of each of the electrode layers.

4. The support for the electric heating type catalyst according to claim 1, wherein the portion having the thermal expansion coefficient lower than that of the honeycomb structure is an intermediate layer having a thermal expansion coefficient lower than that of the honeycomb structure.

5. The support for the electric heating type catalyst according to claim 4, wherein the intermediate layer has a thickness of 3 to 400 μm.

6. The support for the electric heating type catalyst according to claim 4, wherein the intermediate layer has an area larger than that of each of the electrode layers, and wherein,
   in a projection plane on the side surface of the honeycomb structure, a projection plane of each of the electrode layers is completely included in a projection plane of the intermediate layer.

7. The support for the electric heating type catalyst according to claim 1, wherein the honeycomb structure comprises a silicon-silicon carbide composite material or silicon carbide as a main component.

8. The support for the electric heating type catalyst according to claim 1, wherein the portion having the thermal expansion coefficient lower than that of the honeycomb structure comprises an oxide ceramic, or a mixture of a metal or a metal compound and an oxide ceramic.

9. The support for the electric heating type catalyst according to claim 1, wherein each of the electrode layers comprises a mixture of a metal or a metal compound and an oxide ceramic.

10. An exhaust gas purifying device, comprising:
    the support for the electric heating type catalyst according to claim 1, the support being disposed in an exhaust gas flow path through which an exhaust gas from an engine is allowed to flow; and
    a cylindrical metal member for housing the support for the electric heating type catalyst.

* * * * *